No. 853,144. PATENTED MAY 7, 1907.
G. WRIGHT.
VARIABLE SPEED TRANSMISSION DEVICE.
APPLICATION FILED FEB. 14, 1907.
2 SHEETS—SHEET 1.
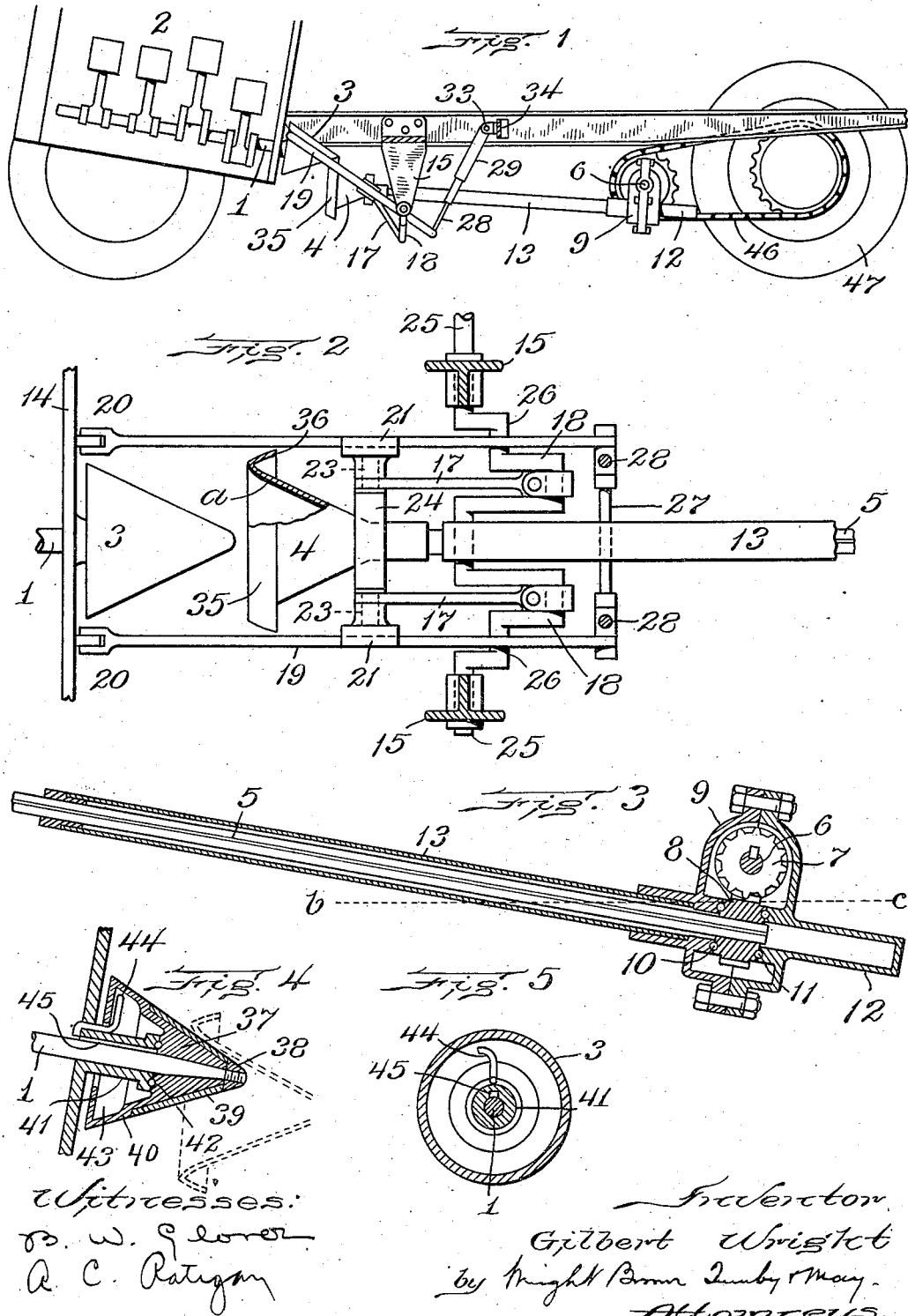

No. 853,144. PATENTED MAY 7, 1907.
G. WRIGHT.
VARIABLE SPEED TRANSMISSION DEVICE.
APPLICATION FILED FEB. 14, 1907.
2 SHEETS—SHEET 2.
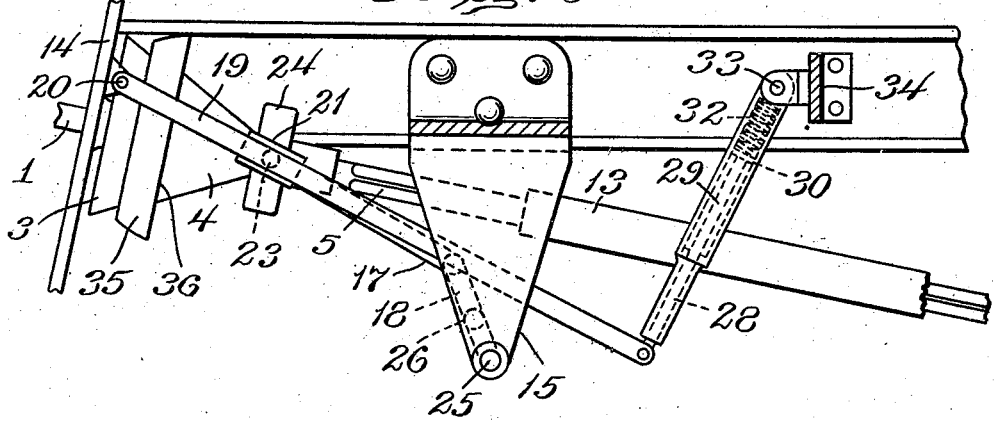
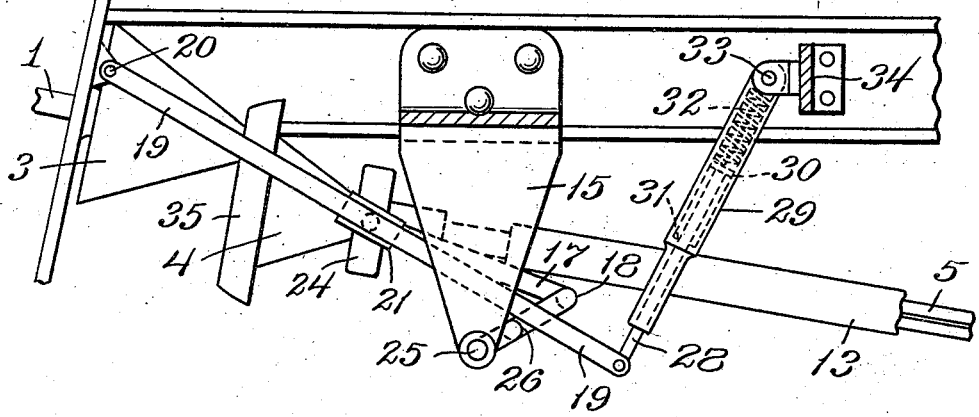
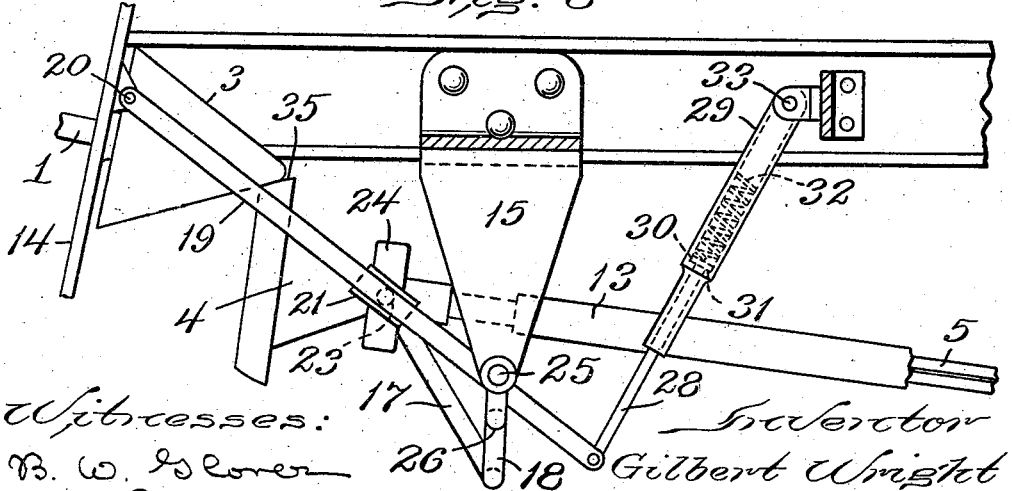
Witnesses:
B. W. Glover
A. C. Ratigan
Inventor
Gilbert Wright
by Wright Brown Quinby & May
Attorneys.

UNITED STATES PATENT OFFICE.

GILBERT WRIGHT, OF PITTSFIELD, MASSACHUSETTS.

VARIABLE-SPEED-TRANSMISSION DEVICE.

No. 853,144.          Specification of Letters Patent.          Patented May 7, 1907.

Application filed February 14, 1907. Serial No. 357,340.

*To all whom it may concern:*

Be it known that I, GILBERT WRIGHT, of Pittsfield, in the county of Berkshire and State of Massachusetts, have invented certain new and useful Improvements in Variable-Speed-Transmission Devices, of which the following is a specification.

This invention relates to gearing for transmitting power from a driving to a driven shaft, in such manner that the speed of the latter may be varied, while that of the former remains constant.

The invention is of universal application, but is particularly adaptable to automobile driving where the regulation of the speed of the usual internal combustion motors is difficult.

The objects of the invention are to provide a friction drive of which the speed ratio may be rapidly changed to the exact amount desired, and reversed by movements of a single actuating member, and to so construct the frictional surfaces as to reduce the loss of energy and wear due to slipping of parts of these surfaces when the speed ratio is less than one, by so constructing them that the area of contact becomes successively less as the speed of the driven shaft becomes less.

In the accompanying drawings I have shown a mechanism embodying the principles of my invention as applied to an automobile.

Figure 1 represents the driving device in elevation and a diagrammatic view of part of the automobile motor. Fig. 2 represents a plan view, partially in section, on a larger scale, of the transmission device. Fig. 3 represents a longitudinal vertical section of the portion of the transmission gearing connected with the driven shaft. Figs. 4 and 5 represent axial and cross sections of the driving member of the transmission mechanism. Figs. 6, 7 and 8 represent in elevation, different positions of the transmission device for fast and slow forward motion, and backing, respectively.

The same reference characters indicate the same parts in all the figures.

In the drawings, the driving shaft is represented by 1, and may be turned at a more or less constant rate of speed by any sort of motor, such as the four-cylinder internal combustion engine illustrated diagrammatically at 2 in Fig. 1. Rigidly fixed to the shaft 1 is a driving cone 3 which co-operates frictionally with the driven member 4. The latter is in the form of a conical shell of which the internal surface is adapted to bear against the external conical surface of the driver 3.

The driven conical shell is secured to the end of an intermediate shaft section 5 which operates the driven shaft 6 by means of skew gears 7 and 8, the latter being loosely mounted upon the intermediate shaft 5 so that the shaft may slide longitudinally through it. This shaft is of non-circular section, being prismatic or having a spline so that it may turn the gear 8 in any position. Surrounding the gears is a casing 9 which is hung from the driven shaft 6, and has ball bearings 10 and 11 for the opposite sides of the gear 8. Extending from opposite sides of the casing is a closed sleeve 12 and an open sleeve 13 within which the intermediate shaft 5 is housed. The casing sleeves, gear 8 and intermediate shaft are all hung from the shaft 6, and are capable of swinging about the axis of the latter in a vertical plane.

The conical shell and the ends of the shaft to which it is connected are supported from the plate 14 of the frame and brackets 15 by links or connecting rods 17, cranks 18 and pivoted guides 19. Of these guides there are two pivoted at 20 to the plate 14 on opposite sides of the driving cone, and mounted to slide upon them are travelers 21 pivoted to trunnions 23 extending at diametrically opposite points from the ring 24 which incloses a ball bearing surrounding the sleeve of the conical shell 4. The connecting rods 17 are pivoted at one end about the trunnions 23, and at the other to the cranks 18 which are formed or secured upon the rock-shaft 25. These cranks lie within the links 19, but the outer arms thereof have offset shoulders 26 which lie under the links. The ends of the latter are joined by a cross-bar 27 to which are linked plunger rods 28 entering telescopically the casings 29. Heads 30 on the ends of the plunger rods and internal shoulders 31 in the casings prevent outward movement of the rods beyond a certain point. Springs 32 contained between the other ends of the casings and the heads 30 yieldingly resist movement of the plungers and links in the opposite direction. The tubular casings are pivoted at 33 to brackets 34 fixed to the frame.

When the parts are located as shown in Fig. 6, the driven shaft is operated at its highest speed, the driven cone 4 being in contact over practically all of its inner surface with the driving cone 30, and turning at the same speed therewith. The shaft 5 then bears the relation to the gear 8 shown in Fig. 3. However, on turning the rock-shaft 25 to the right, the driven cone is withdrawn toward the apex of the driver, being, however, all the time forced against the upper elements of the driver by the springs 32 pressing on the guides 19 and producing the necessary friction through the sliding blocks 21 and bearing 24. As the driven cone moves farther to the right, the part which is brought into contact with the driver becomes of larger radius, while it contacts with a portion of constantly-diminishing radius on the driver until it arrives in the position of Fig. 7, where a zone near the base of the driven cone is in contact with the apex of the driver. This is practically the slowest speed position. Movement of the rock-shaft from the position of Fig. 7 to that of Fig. 8, carries the driven shell wholly away from the apex of the cone downward and to the left beneath the driver. It is kept from falling away by means of the plunger rods 28 of which the heads then come into contact with the shoulders 31. Thus the guides are fixed and the pressure of the shaft through the connecting rods 17 forces the driven cone upward toward the driver until the external surface 35 bears against the driver. It will be noticed that this external surface is formed upon a flange or lip 36 which surrounds the base of the shell 4, and is given an outward taper on its exterior. Thereby while the elements of the interior surface of the shell are parallel with the corresponding elements of the driver, on the other hand the elements of the external surface 35 are approximately parallel with the diametrically opposite elements of the driver. Thus when the driven member is brought beneath the driver, and into contact therewith, it presents a sufficiently extended surface for driving, and is thereby reversed in direction.

In returning the driven shell to the forward position, the rock-shaft is turned in the opposite direction whereupon the shell is first retracted from the driver, and then the offsets 26 engage under the guides 19 and lift them so that by the time the shaft has rotated far enough to move the shell toward the left again, it has been lifted above the axis of the driver so as to come into forward driving contact.

It will be noticed that the internal surface of the driven shell is not a perfect cone from base to apex, but that although the elements are straight, and the surface is truly conical from the innermost part to the point a, from that point on the surfaces curve outward, flaring like the rim of a bell. This construction is provided in order to diminish the slip and frictional loss of energy and wear whenever the driven member is rotating slower than the driver. When the shell is wedged up on the cone so that the entire extent of their conical surfaces is in engagement, there is of course no slip, and a very extended friction surface is provided, whereby the drive is certain. Upon movement of the shell toward the right, however, the driver ceases to fill the interior of the shell, whereupon the springs 32, together with the weight of the parts, causes the shell to swing downward about the axis of shaft 6 as a pivot. This of course moves the shaft 5 out of alinement with the axis of the driver, and brings the internal conical surface out of parallelism with the driver. Then the contact with the shell is made at some point between a and the rim, where the outward curvature is given to the shell, and thus the area of contact is comparatively restricted. Accordingly only those parts of the driver and driven member which have approximately the same linear velocity are in contact so that there is no, or hardly any, slipping between those portions of one member which move more or less rapidly than the adjacent portions of the other member. The curvature is such, constantly increasing from the point a to the rim of the shell, that the area of contact continually diminishes as the rim of the shell moves toward the apex of the cone, and swings further about the pivotal axis 6. Thus as the speed ratio of the shell with respect to the driver diminishes and there is a more marked difference of speed between the driver and shell on opposite sides of the line whereon their peripheral speeds are equal, there is a less and constantly diminishing area of contact between parts having unequal velocities, and thus the tendency to wear is diminished. As one or both of the bearing surfaces may be covered with leather, raw hide, paper, etc., to increase the coefficient of friction, the question of wear is a serious consideration. Therefore as the speed of the shell becomes a smaller fraction of that of the driver, and a less powerful engagement between them is necessary to perform the driving, the bearing area becomes correspondingly and proportionally less.

The driving cone 3 is shown in detail in Figs. 4 and 5. It consists of a conical core 37 which is forced onto the tapered end of the shaft 1 and is secured by a conical nut 38. There is a cover 39 of paper, raw hide or leather to provide the necessary friction, which is held between an annular shoulder 40 and the nut 38. The shaft passes through a sleeve 41 between the end of which and the core 37 is a ball bearing 42. Within the larger portion or base of the cone is a cavity 43 which receives oil for lubricating the bearing. As the cone rotates, the oil is thrown out toward the periphery by centrifugal force, and is scooped by the curved end of a pipe 44 which discharges upon the top of the shaft 1 adjacent the end of a groove 45 in the sleeve 41. Through this groove the oil may run to lubricate the bearing of the shaft and the ball bearing 42, thence flowing into the cavity 43. The gear 8 and its bearings 10 and 11 also run in oil, the end of sleeve 12 being closed for that purpose and containing oil which rises normally to the level indicated by the dotted line $b$—$c$ in Fig. 3.

The shaft 6 may either be a main driven shaft, or it may serve as a primary shaft for driving by chains 46, the driving wheels 47 of an automobile.

I claim:—

1. A variable speed transmission device, comprising a positively moved tapered driver having a frictional external surface, and a driven member having an internal tapered surface, said surfaces being adapted to bear frictionally, and one being movable longitudinally relatively to the other, one of said surfaces being longitudinally curved to cause increase and diminution of the bearing area as the speed ratio of the driven member is increased and diminished respectively.

2. A variable speed transmission device, comprising a driving cone, and a hollow conical driven member of which the elements of the internal bearing surface are straight adjacent the apex and curve outwardly toward the rim; said driven member and driver being relatively movable bodily in a longitudinal direction and angularly in a transverse direction, whereby the length of contact between them may be increased in the high-speed position and diminished in the low-speed position.

3. A variable speed transmission mechanism, comprising a driver having an external conical friction surface, a shell having internal and external oppositely tapered friction surfaces, each of which is adapted to be brought into contact with the driver at different points, whereby the shell may be driven at a plurality of speeds, and in either direction; and a shaft to which said shell is rotatively engaged with a sliding connection.

4. A variable speed transmission mechanism, comprising a driver having an external conical friction surface, a shell having an internal tapered surface of which the elements are approximately parallel to the corresponding elements of the driving surface and a lip surrounding the open rim of the shell, formed with a reversely tapered external surface; and a shaft with which said shell is connected rotatably and with provisions for relative movement, whereby the internal surface may be brought into contact with the driver at a plurality of points on one side of the axis thereof and the external surface may be caused to make contact with the driver on the opposite side of its axis.

5. A variable speed transmission mechanism, comprising a driver having an external conical friction surface; a transverse driven shaft; an intermediate shaft section in geared relation with the driven shaft, and movable lengthwise with respect to the connecting gearing; and a shell fixed to said intermediate shaft and having an internal tapered surface adapted to make contact with the external surface of the driver.

6. A variable speed transmission mechanism, comprising a driver having an external conical friction surface, a shell having an internal tapered surface of which the elements are outwardly curved; an intermediate shaft section to which said shell is secured, arranged in the same plane with the axis of the driver; a transverse driven shaft in a different plane; gearing connecting the shafts, with which the intermediate shaft is engaged so as to cause rotation and permit longitudinal sliding motion; and a holder containing said gearing oscillative about the axis of the transverse shaft, whereby the shell may be brought into contact with the driver at points of varying peripheral speed and over areas of different extent.

7. A variable speed transmission mechanism, comprising a driver having an external conical friction surface; a transverse driven shaft; an intermediate shaft section hung so as to be oscillative about the axis of the driven shaft into line with the axis of the driver; gearing connecting said shaft sections; and a hollow cone connected with the intermediate shaft so as to transmit rotation thereto, while being movable in an axial direction with respect to the driver; said hollow cone having an interior bearing surface of the same angular divergence near the apex as the driver, and a constantly increasing divergence toward the rim.

8. A variable speed power transmission mechanism, comprising a driving friction cone, a driven cone having an internal friction surface, a transverse shaft, an intermediate shaft section to the end of which the driven cone is fixed adapted to lie in line with the axis of the driver and to be tilted out of line, intermeshing gears on the transverse and intermediate shafts, the latter having a longitudinal sliding engagement with its gear, and a casing inclosing the gears and the end of the intermediate shaft, adapted to contain oil.

9. A variable speed power transmission mechanism, comprising a driving friction cone, a driven cone having an internal friction surface, a transverse shaft, an intermediate shaft section to the end of which the driven cone is fixed adapted to lie in line with the axis of the driver and to be tilted out of line, intermeshing gears on the transverse and intermediate shafts, the latter having a longitudinal sliding engagement with its gear, a rigid holder hung on the transverse shaft supporting the gear of the intermediate shaft, a bearing for the driven cone, a support therefor, and means for moving said support to bring the internal surface of the driven cone into contact with different portions of the driver.

10. A variable speed power transmission mechanism, comprising a driving friction cone, a driven cone having an internal friction surface, a shaft connected with the driven cone for operation thereby and with respect to which the latter is movable bodily, a bearing for the cone, guides for said bearing, and means for shifting the bearing along said guides to bring the driven cone into contact with different parts of the driver.

11. A variable speed power transmission mechanism, comprising a driving friction cone, a driven cone having an internal friction surface, a shaft connected with the driven cone for operation thereby and with respect to which the latter is movable bodily, a bearing for the cone, pivotally mounted guides for said bearing, links pivoted to said bearing, and cranks connected with said links, rotation of said cranks serving to move the driven cone to bring its friction surface into contact with different portions of the driver.

12. A variable speed power transmission mechanism, comprising a driving friction cone, a driven cone having an internal friction surface, a shaft connected with the driven cone for operation thereby and with respect to which the latter is movable bodily, a bearing for the cone, pivotally mounted guides for said bearing, yielding means acting upon the guides in a direction to press the friction surface at one side of the driven cone toward the adjacent portion of the driver, and means for shifting the bearing along said guides to bring the driven cone into contact with different parts of the driver.

13. A variable speed power transmission mechanism, comprising a driving friction cone, a driven cone having an internal friction surface of which the elements are substantially parallel to the corresponding elements of the driving cone and an outwardly turned lip surrounding its rim or base, formed with an external, reversely tapered conical surface; a shaft to which the driven cone is connected with a rotative driving engagement, which permits motion bodily; a bearing within which the cone rotates, links pivoted to the bearing; rocking cranks pivoted to the links arranged so as to shift the driven cone longitudinally of the driver, pivoted guides along which the bearing is arranged to slide; springs acting on the guides to force the latter and the driven cone laterally toward the driver; and stops for limiting the motion of the guides when the cones are moved out of engagement.

14. A variable speed power transmission mechanism comprising a driving friction cone, a driven cone having an internal friction surface of which the elements are substantially parallel to the corresponding elements of the driving cone and an outwardly turned lip surrounding its rim or base, formed with an external, reversely tapered conical surface; a shaft to which the driven cone is connected with a rotative driving engagement, which permits motion bodily; a bearing within which the cone rotates; links pivoted to the bearing; rocking cranks pivoted to the links arranged so as to shift the driven cone longitudinally of the driver, pivoted guides along which the bearing is arranged to slide; springs acting on the guides to force the latter and the driven cone laterally toward the driver; stops for limiting the motion of the guides when the cones are moved out of engagement, and means on the cranks for engaging the guides and moving them away from said stops in opposition to the pull of the springs.

15. A variable speed power transmission mechanism, comprising rotary driving and driven members of varying diameter having co-operating friction surfaces, the surface of one being longitudinally curved to present a convexity adjacent the other, one of said members being movable axially with respect to the other, and one of the members being arranged to swing transversely of its axis as such axial movement takes place, whereby the longitudinally convex friction surface is maintained in contact with the other surface over a diminishing area as the speed difference increases, and conversely.

In testimony whereof I have affixed my signature, in presence of two witnesses.

GILBERT WRIGHT.

Witnesses:
WILLIAM B. FOOTE,
GEORGE H. FOSTER.